United States Patent
Stiglitz

(10) Patent No.: US 12,472,597 B2
(45) Date of Patent: Nov. 18, 2025

(54) MACHINE TOOL HOLDER, METHOD AND COMPUTER PROGRAM FOR OPERATING A MACHINE TOOL HAVING SUCH A MACHINE TOOL HOLDER

(71) Applicant: ERST-Maschinenbau GmbH, Schorndorf-Haubersbronn (DE)

(72) Inventor: Jürgen Stiglitz, Schorndorf (DE)

(73) Assignee: ERST-Maschinenbau GmbH, Schorndorf-Haubersbronn (DE)

( * ) Notice: Subject to any disclaimer, the term of this patent is extended or adjusted under 35 U.S.C. 154(b) by 912 days.

(21) Appl. No.: 17/597,766

(22) PCT Filed: Jul. 22, 2020

(86) PCT No.: PCT/EP2020/070708
§ 371 (c)(1),
(2) Date: Jan. 21, 2022

(87) PCT Pub. No.: WO2021/013899
PCT Pub. Date: Jan. 28, 2021

(65) Prior Publication Data
US 2022/0266404 A1    Aug. 25, 2022

(30) Foreign Application Priority Data
Jul. 23, 2019   (EP) .................................... 19000343

(51) Int. Cl.
*B23Q 3/157* (2006.01)
*B23Q 7/04* (2006.01)
*B23Q 7/10* (2006.01)

(52) U.S. Cl.
CPC .......... *B23Q 3/15722* (2016.11); *B23Q 7/045* (2013.01); *B23Q 7/046* (2013.01);
(Continued)

(58) Field of Classification Search
CPC .............. Y10T 483/16; Y10T 483/165; Y10T 483/1793; Y10T 483/1795;
(Continued)

(56) References Cited

U.S. PATENT DOCUMENTS 4,716,647 A * 1/1988 Winkler ................. B23Q 7/045
483/22
4,985,971 A   1/1991 Kitamura
(Continued)

FOREIGN PATENT DOCUMENTS

DE         10034973 A1     2/2002
DE    102018008428 A1 *    4/2020 ............. B23Q 7/045
(Continued)

OTHER PUBLICATIONS

International Search Report and Written Opinion, International Application No. PCT/EP2020/070708, date of mailing Oct. 22, 2020, Authorized officer, Michel Schmitt, Forms PCT/IS/210, PCT/ISA/220 and PCT/ISA/237, 18 pages.
(Continued)

Primary Examiner — Sunil K Singh
Assistant Examiner — Michael Vitale
(74) Attorney, Agent, or Firm — Vorys, Sater, Seymour and Pease LLP; Rex W. Miller, II

(57) ABSTRACT

The invention relates to a machine tool cocoon (10) for receiving a workpiece, having a base element (18) on which the workpiece can be disposed, wherein the base element (18) comprises at least one receptacle (47) for receiving and fixing a workpiece (40), and a support device (11) separably connected to the base element (18). The machine tool cocoon (10) can be positioned on a tool position of a tool changing system by means of the support device (11). The invention further relates to a method and a computer program.

7 Claims, 11 Drawing Sheets

(52) U.S. Cl.
CPC ............... *B23Q 7/10* (2013.01); *Y10T 483/16* (2015.01); *Y10T 483/1873* (2015.01)

(58) Field of Classification Search
CPC .. Y10T 483/1873; B23Q 7/045; B23Q 7/046; B23Q 7/10; B23Q 7/1426; B23Q 7/1431
USPC .......... 483/14, 15, 55, 56, 66; 269/287, 288; 29/33 P, 563; 198/345.3, 346.1
See application file for complete search history.

(56) References Cited

U.S. PATENT DOCUMENTS

| | | | | |
|---|---|---|---|---|
| 5,628,604 | A * | 5/1997 | Murata | H01L 21/67769 414/940 |
| 5,803,886 | A * | 9/1998 | Schweizer | B23Q 3/15534 483/31 |
| 8,092,357 | B1 * | 1/2012 | Buus | B23Q 7/045 483/41 |
| 2005/0059538 | A1 * | 3/2005 | Murai | B23Q 41/02 483/15 |
| 2008/0040911 | A1 * | 2/2008 | De Koning | G05B 19/41825 483/1 |
| 2009/0116915 | A1 * | 5/2009 | Kawasumi | B23Q 39/026 483/18 |
| 2010/0018836 | A1 * | 1/2010 | Kikkawa | B23Q 11/0075 409/137 |
| 2010/0296888 | A1 * | 11/2010 | Katoh | B23Q 3/06 409/134 |
| 2016/0114444 | A1 * | 4/2016 | Hofmann | B23Q 3/15536 483/1 |
| 2023/0001526 | A1 * | 1/2023 | Lang | B23Q 3/06 |

FOREIGN PATENT DOCUMENTS

| | | | | |
|---|---|---|---|---|
| EP | | 3354400 A1 | 8/2018 | |
| JP | | 2019030952 A | 2/2019 | |
| WO | WO-2019175024 A1 * | | 9/2019 | ........... B23Q 7/1431 |

OTHER PUBLICATIONS

Japanese Office Action issued Mar. 11, 2024, for Patent Application No. 2022-504565, 17 pages.

* cited by examiner

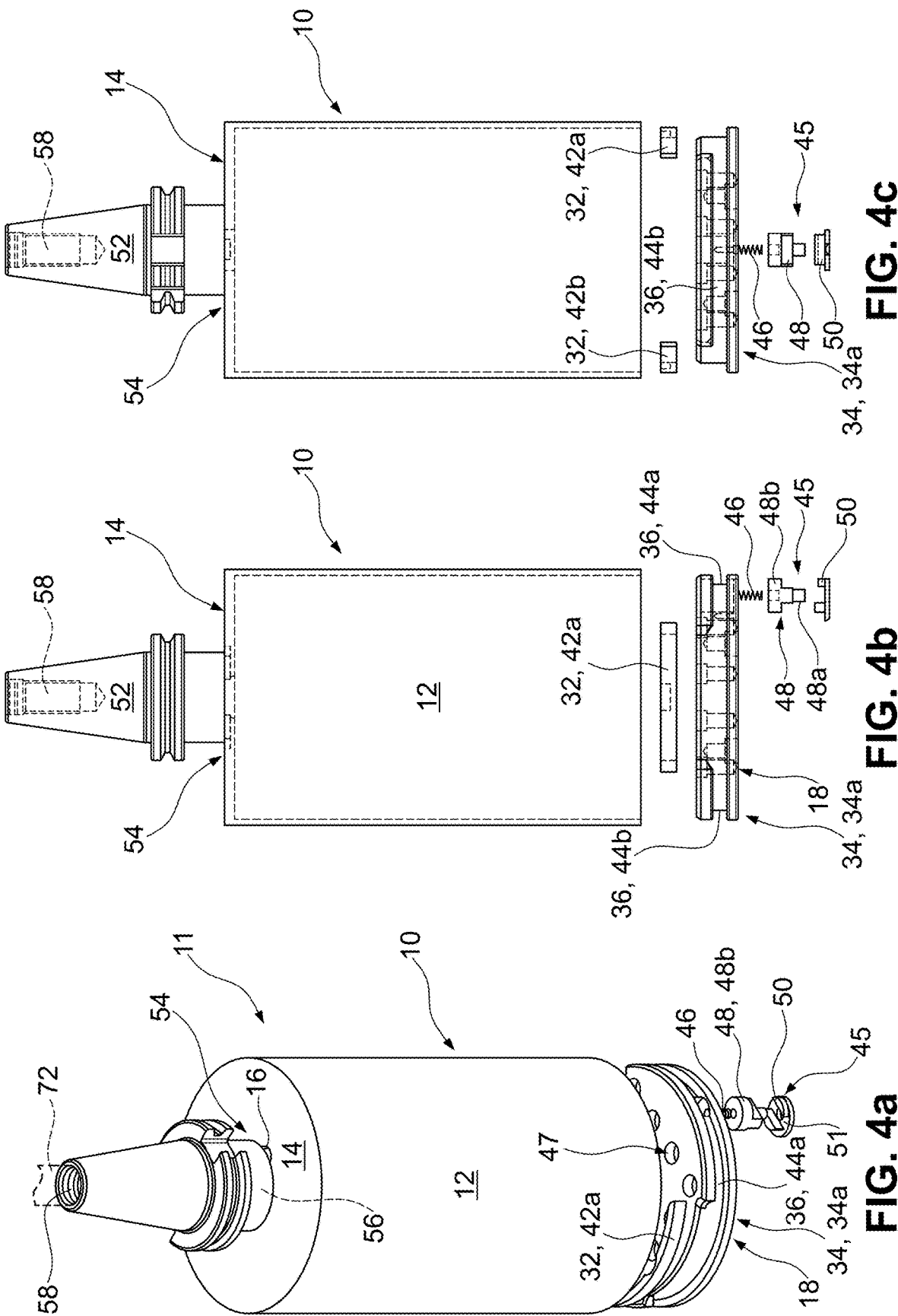

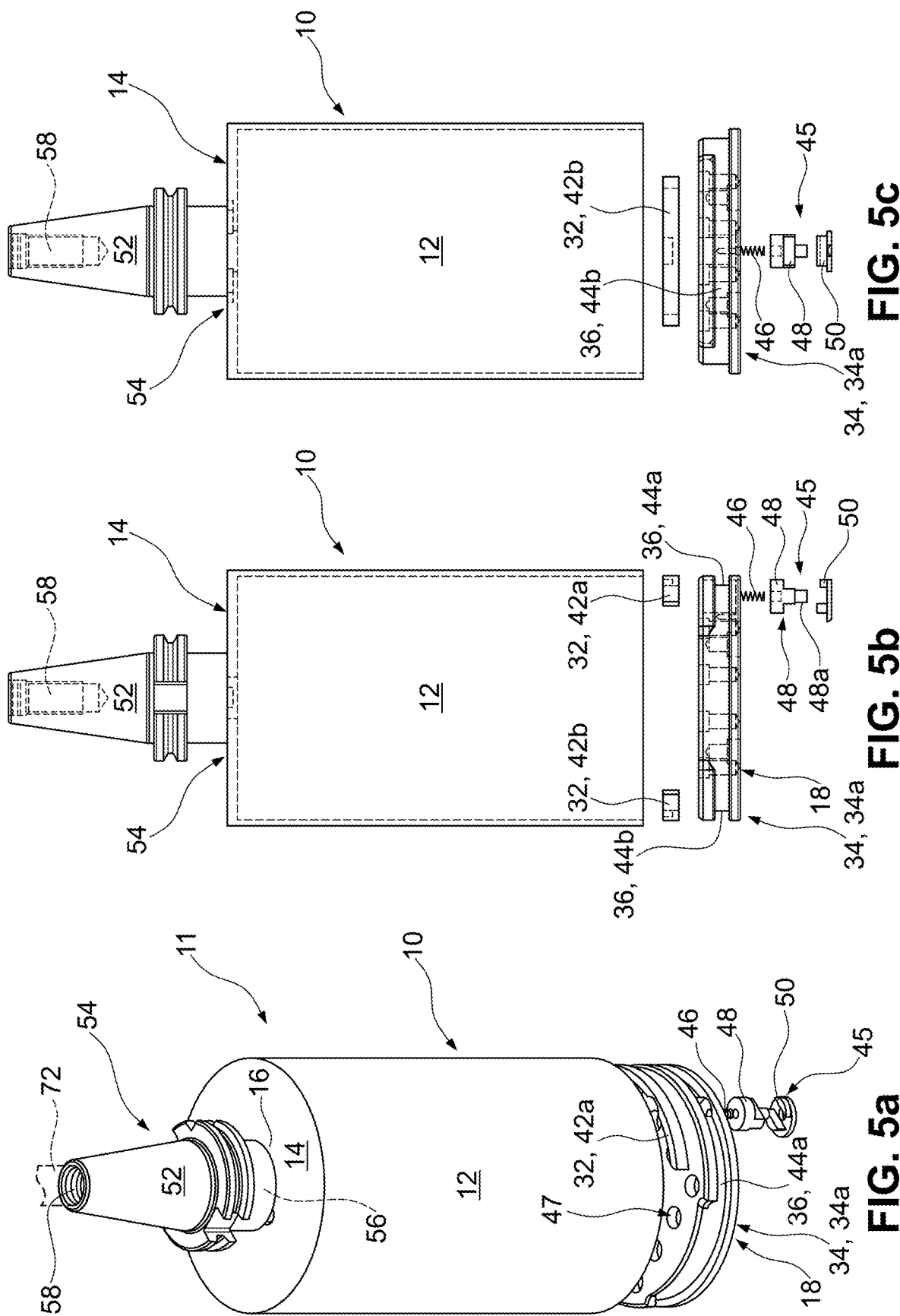

MACHINE TOOL HOLDER, METHOD AND COMPUTER PROGRAM FOR OPERATING A MACHINE TOOL HAVING SUCH A MACHINE TOOL HOLDER

TECHNICAL FIELD

The invention relates to a machine tool cocoon for a machine tool and a method for operating a machine tool.

PRIOR ART

Machine tools are machines for producing workpieces by means of tools. The motion between the tool and workpiece during machining is thereby specified by the machine tool. The material of the workpiece is thereby often machined by means of a plurality of tools, one after the other, in order to produce a component. Machining processes in machine tools typically include milling and turning, but also eroding and pressing can be performed automatically in machine tools. The tool loaded in the machine tool is therefore preferably interchangeable, wherein different tools, such as mills, drills, and indexable tip cutters can be used in the machining processes used in each case. Tool changing devices having tool stores and/or tool magazines are used currently for automated machine tools, for which the tools used in the particular machining steps can be automatically changed out and replaced. A stock of different tools is thereby provided in a storage area, the tool store or tool magazine, connected to the machine tool and is automatically loaded into the machining unit of the machine tool prior to the machining step. The tool is typically mounted in a machining spindle or main spindle. The main spindle is also referred to as a milling spindle if the tool is a mill. The main spindle is particularly the tool interface.

The machine tool, also referred to as a machining center (MC), including the machining steps and the tool changing device, is typically controlled by means of a sequential controller. The main task of the sequential controller during machining of the workpiece is thereby displacing the tool along arbitrarily shaped paths. Monitoring the cutting force of the tool and the tool change can also be a partial task of the sequential controller.

The workpiece to be machined is disposed in a region below the tool, for example. Workpiece clamping systems, such as zero clamping systems, are commonly used in order to ensure precisely reproducible positioning of a workpiece clamping means of the workpiece. The workpiece is thereby manually disposed in the machining position. When the machining of the workpiece is complete, the machine tool is stopped and the machined workpiece, typically the finished component, is removed from the workpiece clamping system and the new workpiece to be machined is disposed in the same. Manually clamping and removing workpieces is time-consuming, both because manual labor is required and because the machine tool must be stopped. To this end, it is necessary to move the tool spindle into a safe position so that a machine operator can open the door.

A tool changing device for a machine tool is known from DE 202006 015 240 U1. The tool changing device describes a device enabling automated changing of tools of a machine tool.

EP 3 354 400 A1 discloses a machine tool for machining dental implants for the dental field. Workpieces can be stored in mounts provided for this purpose in a workpiece magazine.

DE 100 34 973 A1 discloses a machine tool having a tool changer, wherein the workpiece is mounted on a spindle and can rotate with the same in order to be machined by a stationary tool.

SUMMARY OF THE INVENTION, OBJECT, SOLUTION, ADVANTAGES

The object of the invention is to disclose a device allowing simplified changing of workpieces, particularly a device enabling an improved tool changing device and an improved machine tool for automated operation. A further aim of the invention is to produce a method for operating a machine tool also allowing simplified changing of workpieces.

The aim is achieved by a machine tool cocoon according to claim 1 for receiving a workpiece. The machine tool cocoon comprises a base element on which the workpiece can be disposed, wherein the base element comprises at least one receptacle for receiving and fixing a workpiece, and wherein the machine tool cocoon can be disposed on a tool position of a machine tool. The machine tool cocoon comprises a support device separably connected to the base element, wherein the machine tool cocoon can be positioned on a tool position of a tool changing system by means of the support device.

The machine tool cocoon is typically used in a machine tool having a tool changing system. The machine tool cocoon can particularly be used in a tool changing system of the machine tool.

The machine tool can, in the simplest case, comprise a tool changing device or a tool changing system and a machining unit for machining the workpiece. The tool changing device typically comprises a tool store having tool positions for disposing tools. The workpiece to be machined is typically disposed in the machine tool cocoon before the machine tool cocoon is placed in the tool store or the tool magazine.

The tool or tools to be used in each case are typically loaded out of the tool store into a working spindle or main spindle of the machining unit of the machine tool. This can take place in that the machining unit travels directly from the machining position into the tool position of the tool store or tool magazine, picks up the tool by means of a clamping device, preferably a taper chuck, and travels back to the machining position. Alternatively, the tool changing system can also comprise a transfer system used for bringing the tool from the tool position of the tool store into the working spindle. The tools can thereby be brought out of the corresponding tool position of the tool changing system into the working spindle of the machine tool serving for receiving the tool during automated operation of the machine tool. The spindle can eb referred to as the main spindle, working spindle, or tool spindle.

The invention makes use of the insight that not only tools can be stored, transported, and transferred to a tool spindle by means of such a tool store, but also other elements, particularly such as workpieces, if such are prepared accordingly. The machine tool cocoon according to the invention addresses said task as part of the invention. Said cocoon serves for receiving a workpiece and making the same storable and available in a tool store. The machine tool cocoon also serves for transferring the workpiece from the tool store into the workpiece clamping system of the machining unit of the machine tool. The transfer can, as is also typical for tools, take place directly by means of the tool spindle or by means of a transfer system.

The tool store of the tool changing system or the tool changing device typically comprises 20 or more positions able to be populated with tools. Typically, not all tool positions are needed for an automated machining process, so that open tool positions are available. The machine tool cocoon can be disposed at one or more of the available tool positions. One, two, or more machine tool cocoons can be disposed at available tool positions. One machine tool cocoon is thereby provided per tool position. The quantity of machine tool cocoons used is preferably freely selectable, depending on how many workpieces are to be machined in an automated machine run.

When operating the machine tool, the machine tool cocoon having the workpiece can be brought from the tool position of the tool store into a workpiece clamping system, preferably a zero point clamping system, of the machine tool. The zero point clamping system is preferably a partial element of the machine tool, particularly of the machining unit of the machine tool. The zero point clamping system serves for positioning the workpiece in the machining position. The machine tool cocoon can thereby be brought from the tool position in the tool store to the machining position by means of the identically structured clamping device used for transferring the tools.

While executing the machining program of the machine tool, both the tool can be brought out of the tool store into the tool spindle and thus changed out, and the workpieces can be changed out by means of the machine tool cocoon. The machine tool cocoon, together with the workpiece to be machined, is thereby brought out of the tool store into the machining position, for example into the zero point clamping system. Machined workpiece can be brought out of the machining position into the tool store using the machine tool cocoon.

It is thereby advantageous that through the use of the machine tool cocoon a plurality of, or arbitrarily many, workpieces can be machined in one machine tool run without the machine tool needing to be stopped for changing out the workpiece. It is particularly advantageous that no reconfiguration of the tool changing device is necessary.

A plurality of workpieces can preferably be machined by means of a plurality of tools in one machine run, without the machine tool needing to be stopped. For machine tools without the use of the machine tool cocoon, only tools can be changed for different machining processes on one workpiece in one machine run. The machine tool is then typically stopped and the workpiece to be machined is changed. The machine tool is then typically restarted and runs through the machining program again.

In an automated machining process of the machine tool, both an automated tool change and an automated workpiece change can be done advantageously by using the machine tool cocoon. It is thereby advantageous that it is not necessary to reconfigure the tool changing system in particular, because the tool store is also used as a workpiece store. It is also not necessary to reconfigure the tool changing system in order to implement an additional transfer device for changing a tool from other storage positions than the tool storage position during an automated machining process of the machine tool.

A machine operator can load the machine tool cocoon outside the machine tool with a workpiece to be machined and place the same in the tool store. The machine tool does not need to be stopped for this purpose. When a workpiece is to be machined, the corresponding machine tool cocoon can be removed from the tool store and positioned in the machining unit by means of the workpiece clamping system. The workpiece can then be machined and after machining is complete the workpiece can then in turn be brought back to the tool store from the machining unit by means of the machine tool cocoon, from which the machine operator can then remove the machine tool cocoon including the machined workpiece. During machining, the machine operator can load one or more further machine tool cocoons, or can perform other activities such as checking, reworking, deburring, etc. Substantial working time can thereby be saved.

The machine tool cocoon is a device independent of the machine by means of which changing workpieces is substantially facilitated. No special setup or preparing of the machine tool is necessary. Rather, the machine tool cocoon preferably uses exclusively devices of the machine tool provided as standard. The machine tool cocoon can be used by an operator as needed. Setup or changeover of the machine tool cocoon is not necessary, except for providing corresponding programming.

A further potential use of the machine tool cocoon is that the workpiece can be repositioned automatically. That is, while conventional clamping of workpieces in a zero-point clamping system allows only four-axis machining, advanced, multi-axis machining can be implemented by means of the machine tool cocoon as well. To this end, the machine tool cocoon can be first removed from the tool store, preferably by means of the tool spindle, and positioned at the zero-point clamping system. The support device is then removed from the base element, as described above, and is preferably positioned in the tool store. The workpiece is then machined. Now the support device can again be positioned on the base element and locked to the same by means of the tool spindle. The machine tool cocoon can be rotated, for example, preferably in a range from $>0°$ and $<360°$, for example 90° or less, for repositioning by means of the spindle. The exact angle can be dependent on the particular zero-point clamping system and/or on the machining order. After repositioning, the support device can be removed again and preferably brought into the tool store. The workpiece can then be further machined.

The base element comprises at least one receptacle for receiving and fixing a workpiece. In the simplest case, such a receptacle can be implemented as a bore, preferably a threaded bore, for receiving clamping means or chucks for attaching the workpiece to the base element. A vise or other multi-jawed chuck or clamp can also be provided. Special clamping means for particular machining processes can also be received on the base element, so that the workpiece change is further facilitated.

In a preferred refinement, the support device is reversibly separable from the base element by means of a predefined relative motion between the support device and the base element. The support device serves primarily for providing a connection between the base element, preferably remaining in the machining unit during machining, and the tool spindle or transfer system. The base element can be received directly in the workpiece clamping system, preferably the zero-point clamping system. In this respect, removing the workpiece from the base element for machining is not necessary. The support device should, however, be removed prior to machining. The predefined relative motion is preferably performed by means of the tool spindle. As soon as the base element is clamped in the workpiece clamping system, the tool spindle can be driven and can initiate a predefined relative motion of the support device relative to the base element, so that the support device is removed from the base element and can be brought to a position at which said device can remain during machining, for example in the tool store.

It is advantageous that a cover element is provided and can be or is connected to the base element. A closed interior space in the machine tool cocoon can be implemented by means of the cover element. The cover element is preferably part of the support device.

The workpiece can then be protected by the machine tool cocoon, preferably during the transfer process from the tool store of the tool changing system out of the tool changing position into the machining position. The machine tool cocoon surrounds the workpiece prior to machining by the tool. The machine tool cocoon can thereby also be referred to as a workpiece casing. The machine tool cocoon is preferably a workpiece casing. The machine tool cocoon can also enclose and thus protect the machined workpiece during return transport from the machining position into the tool changing position.

The machine tool cocoon can also prevent oversized workpieces from being used and the machine tool being damaged, particularly during the transfer process. The dimensions of the machine tool cocoon preferably limit the size of the workpiece.

In one embodiment of the machine tool cocoon, it can be provided that a shell element is disposed between the cover element and the base element. A three-part machine tool cocoon can thereby be implemented. The machine tool cocoon can thus be easily assembled and separated. The workpiece can thereby be disposed easily within the machine tool cocoon. For example, the shell element can be a cylindrical casing or a tube or can have any other geometry such as a rectangular cross section. The shell element is preferably disposed between the cover element and the base element. The cover element bounds the machine tool cocoon in the direction of the spindle and/or of the clamping device. The base element bounds the machine tool cocoon in the direction of the zero point clamping system of the machine tool, particularly of the machining area of the machine tool. The base element preferably remains in the zero-point clamping system during the machining process of the workpiece. The workpiece typically remains on the base element during the transport step and the machining process. The cover element and/or the shell element are typically removed from the machining position after positioning the workpiece in the zero-point clamping system. The cover element and/or the shell element are preferably brought to the tool position. The shell element can also be part of the support device and can be implemented as a single part with or integral to the cover element.

The support device comprising the cover element and/or the shell element can comprise any suitable shape overall, such as an L, I, or T shape, as a clip, shackle, cap, or the like. The significant function of the support device is to form a connection between the base element and the tool spindle, in order to thus position the base element including the workpiece on the workpiece clamping system and also to transport the same into the tool store.

The support device, particularly the cover element of the support device, of the machine tool cocoon preferably comprises a recess particularly serving for receiving a clamping device, preferably a tool taper or quick-release taper. By means of the receptacle, a clamping device can be attached to the machine tool cocoon, preferably removably attached. The receptacle can be implemented in the form of an elongated hole, for example, and can comprise a recess, preferably centered, for receiving the clamping device, at least for receiving a partial element of the clamping device. An interface of the clamping device implemented as a counterpart can be introduced into the receptacle, particularly into the elongated hole having the recess. Said clamping device can then be rotated and thus positioned outside of the plane of the elongated hole. The clamping device can thereby be removably fixed to the support device, particularly to the cover element. When the clamping device is removed from the support device, the fixing can be removed by rotating in the opposite direction and the clamping device can be displaced out of the support device and separated therefrom by means of a corresponding vertical motion. A simple interface between the machine tool cocoon and the clamping device is thereby advantageously produced. The clamping device is thereby preferably a standard tool receptacle as used in tool changing systems. The clamping device can also be permanently attached to the support device and not non-destructively removable.

Alternatively, a modified tool receptacle or a modified clamping device can be used, said device being directly removably or non-removably connected to the support device or the cover element. For example, the clamping device can be welded, riveted, soldered, or glued to the support device or the cover element.

The support device, preferably comprising the cover element and/or the shell element, can be removably connected to the base element and/or fixed to the same by means of a locking device. The connection is preferably removable. The support device can thereby be displaced separately from the base element. For example, said device can be transported into the tool positions of the tool changing system.

The locking device enables removing the support device or the shell element and/or the cover element after the machine tool cocoon is disposed in the machining position of the machining unit of the machine tool. The base element can thereby remain in the machining area, preferably in the zero-point clamping system, and the support device or the shell element and/or the cover element can be removed from the machining area.

The machine tool cocoon or a part of the same, namely the support device or the cover element and/or the shell element, can thus be brought into the tool store again after the workpiece and base element are disposed in the machining position and can be positioned there as an empty machine tool cocoon. This is typically the previous tool changer position of the machine tool cocoon having the workpiece. Removing the support device or the cover element and/or the shell element can be done directly by means of the tool spindle. The locking can thereby be released easily, particularly by means of a relative motion between the base element and the shell element. The locking device can thus be actuated by means of a relative motion between the base element and the support device or shell element and/or cover element. The relative motion can be a rotary motion, for example, or a linear motion, or a combination of both.

Alternatively or in addition, a transfer system of the tool changing system can be used for transporting the tool and the machine tool cocoon, wherein the tool and the machine tool cocoon is particularly inserted in the working spindle of the machining unit.

In a preferred embodiment, the shell element and/or the cover element and/or the base element of the machine tool cocoon are rotationally symmetrical in design. The shell element can be a cylindrical shell element. The shell element can also be cone-shaped. In a further embodiment, the shell element can also comprise a hyperbolic shape. The shell element can further have a polygonal shell body or a rectangular cross section.

The cover element can be implemented in the shape of a cone or a cup.

It is thereby advantageous that the dimensions of the tool changer positions can be optimally utilized. The base element can further be rotationally symmetrical in design. The base element is preferably implemented as a disc, preferably a rotationally symmetrical disc, having a finite thickness. The base element can thereby fit into the shell element or the cover element. When installing the base element, the shell element and/or the cover element can be placed over the base element, for example. By rotating or linearly displacing, the base element can be fixed to the support device or the shell element and/or the cover element by means of the locking device. The cover element is preferably also rotationally symmetrical in design. The cover element can thereby be inserted into the shell element and connected to the same, removably or not removably. The cover element, the shell element, and the base element thereby preferably have the same rotationally symmetry.

In a further embodiment of the machine tool cocoon, at least one first locking element of the locking device is disposed on the support device or the shell element and/or the cover element and at least one second locking element is disposed on the base element, wherein the first locking element and the second locking element engage with each other for connecting the support device, preferably the shell element and/or the cover element, to the base element.

The first locking element and the second locking element preferably each comprise means for producing and releasing the connection by means of a relative motion, particularly a rotary motion and/or linear motion between the first locking element and the second locking element. An operative connection between the first locking element and the second locking element can thereby preferably be implemented by a rotary motion and/or linear motion. It is thereby advantageous that the rotation and/or linear motion is a simple motion implemented in the machine tool. The operative connection can thereby be mechanical.

The operative connection can also alternatively be implemented by means of magnetic locking elements. These can be, for example, a permanent magnet as a first locking element and a magnetic or magnetizable counterpart as a second locking element.

In one variant of the machine tool cocoon, the locking device is preferably embodied as a bayonet joint system. The first locking element thereby preferably comprises two or more protrusions and the second locking element comprises two or more recesses, wherein the protrusions and the recesses can engage in each other and can be fixed and released by rotating.

Alternatively, the locking device can be implemented as a sliding system, so that the support device can be pushed laterally across the base element. In this sense, the first locking element can be a strip and the second locking element can be a groove corresponding to the strip, or vice versa.

In a preferred embodiment, the machine tool cocoon, preferably the base element, comprises at least one closure lock, preferably in the form of an anti-rotation device. The closure lock or anti-rotation device is preferably a latching device. The closure lock preferably comprises a spring, preferably a compression spring, a clamping bolt, and a pressure plate. The base element can be securely fixed to the support device or the shell element and/or the cover element by means of the closure lock. This is important in order to ensure secure transporting of the machine tool cocoon during the transfer process from the tool store of the tool changing system into the machining unit.

The closure lock acts between the support device and the base element. The closure lock is preferably implemented as a rotational lock if the support device can be removed from the base element by rotating relative to the same. The closure lock is preferably automatically released when the base element is clamped in a workpiece clamping system, so that when the closure lock is released, the support device can be removed from the base element. For example, the clamping bolt engages in a corresponding recess in order to produce an interlocked engagement for locking the closure lock. When the clamping bolt is slid, said bolt comes out of the said recess and thus releases the interlocked engagement.

The machine tool cocoon, particularly the shell element and/or the cover element and/or the base element, are preferably made of a metal or a metal alloy. Sufficient strength is thereby ensured. The shell element can thereby be made from a solid metal body, for example a metal cylinder. Alternatively, the shell body can also comprises hole, that is, can be perforated. This can be advantageous in order to save weight. The shell element can also comprise struts for spacing apart the cover element and the base element. A certain protection for workpieces disposed within the machine tool cocoon can be thereby implemented. Sufficient strength of the machine tool cocoon, particularly of the shell element, must be ensured.

In an alternative embodiment, the shell element and/or the base element and/or the cover element can be made of plastic. It can also be alternatively provided that the shell element and/or the base element and/or the cover element are made of wood. Alternatively, a carbon fiber material can be used for the shell element and/or the base element and/or the cover element. Sufficient shape stability of the material used is important here.

It is thereby favorable that the machine tool cocoon is and can be used for stocking workpieces in the tool store of the tool changing device of the machine tool. Workpieces to be preferably machined can thereby be stored at tool positions of the tool store can be brought to the machining position during a machine tool run by the same transfer unit and tool spindle bringing the tools into the machining position. The workpieces and the base element are preferably thereby brought into the zero-point clamping system of the machining position. The base elements, including the machined workpieces, can then be brought back, by means of the same transfer unit, out of the machining position into the tool position of the tool store by means of the machine tool cocoon. The machine tool cocoon is thereby closed during transport and/or during the transfer process. The machine tool cocoon is opened at the machining position. The locking device is thereby opened. The workpiece positioned in the machining position, preferably with the base element of the machine tool cocoon.

The object is further achieved by a tool changing system having a tool store and/or tool magazine. The tool changing system comprises tool positions for positioning tools and workpieces. Machine tool cocoons in particular can be positioned at tool positions in the tool store and/or tool magazine. The tool changing system can also comprise a transfer system.

The object is further achieved by a machine tool having a tool changing device and at least one machining unit. The machine tool can also comprise a transfer device. The tool changing device comprises a tool store having tool positions, wherein the tools and machine tool cocoons can be disposed and positioned in the tool positions.

The tool changing device and the machine tool have the advantages and features already described in conjunction with the machine tool cocoon. In this respect, reference is made to the description of the machine tool cocoon.

In a preferred embodiment of the machine tool, the tools and the machine tool cocoon are brought into the machining unit. This can be done by means of the spindle of the machining unit of the machine tool. Alternatively, the tool and/or machine tool cocoon can also be brought by means of the transfer device and the working spindle or tool spindle of the tool changing device and the tool spindle.

Automated operation of the machine tool can thereby be made possible, wherein a plurality of workpieces can be machined one after the other, without needing to stop the machine tool and without workpieces needing to be changed out manually. The plurality of workpieces can preferably be machined by means of different tools in one machine run.

The object is further achieved by a method for automatically operating a machine tool, wherein the machine tool comprises a tool changing device and a machining unit, wherein both tools for use in the machining unit and workpieces to be machined can be disposed in the tool changing device, wherein the workpieces are disposed in a machine tool cocoon for use in the tool changing device. The machine tool cocoon is preferably implemented according to one of the preferred embodiments of a machine tool cocoon according to the first consideration of the invention, as described above.

The tools and the machine tool cocoon can preferably be transferred from the tool store into the machining unit by means of a working spindle or of a transfer unit of the tool changing device in the method for operating the machine tool. Furthermore, machined workpieces can be brought out of the machining position into the tool store using the machine tool cocoon.

In a preferred refinement, the method comprises the steps: grasping the machine tool cocoon having a workpiece disposed therein by means of the tool spindle; transporting the machine tool cocoon to a workpiece clamping system of the machining unit; clamping a base element of the machine tool cocoon in the workpiece clamping system; displacing a support device of the machine tool cocoon relative to the base element for opening the machine tool cocoon; and machining the workpiece. Grasping the machine tool cocoon preferably comprises clamping the machine tool cocoon to the tool spindle. To this end, a clamping means such as preferably a tool taper or quick-release taper is preferably disposed on the machine tool cocoon.

The displacing of the support device relative to the base element is preferably performed by means of a motion of the tool spindle. The tool spindle is still in contact with the support device at this point in time, so that a motion of the tool spindle is transferred to the support device. The base element is clamped and stationary. The relative motion can particularly comprise a rotary and/or linear motion of the tool spindle.

After the relative motion of the support device, it is preferably provided that one or more of the following steps is performed: lifting the support device off of the base element by means of the tool spindle; bringing the support device to a location away from the workpiece, preferably to the tool changer; releasing the support device from the tool spindle; and clamping a tool from the tool changer at the tool spindle. The location away from the workpiece can also be within the machining unit, but is preferably the tool store. Said tool store is closed during machining and thus is not contaminated by chips or machining fluid.

Once the machining of the workpiece is complete, the method can comprise one or more of the steps: bringing the support device to the base element; connecting the support device to the base element; and preferably bringing the machine tool cocoon including the machined workpiece into the tool changer. A machine operator can then remove the machine tool cocoon, including the finished, machined workpiece, from the tool changer. During this time, the machining of a further workpiece can already take place.

Alternatively or in addition, it is also possible to machine the workpiece subsequently from a different side after the first machining. To this end, the method can comprise the steps: releasing the workpiece clamping system for releasing the base element; displacing the machine tool cocoon by means of a predefined motion; clamping a base element of the machine tool cocoon in the workpiece clamping system; displacing a support device of the machine tool cocoon relative to the base element for opening the machine tool cocoon; and machining the workpiece. The predefined motion is preferably a rotation, preferably in a range from >0° to <360°, preferably >0° to 180°, preferably in a range from >0° to 90°. Automated multiple side machining is possible in this manner. The spectrum of applications of the machine tool cocoon is thereby further expanded.

To this end, the method preferably comprises one or more of the following steps: grasping a further machine tool cocoon having a workpiece disposed therein by means of the tool spindle; transporting the further machine tool cocoon to the workpiece clamping system of the machining unit; clamping a base element of the further machine tool cocoon in the workpiece clamping system; displacing a further support device of the further machine tool cocoon relative to the further base element for opening the further machine tool cocoon; and machining the further workpiece.

If a closure lock as described above is provided, said closure lock is preferably released before displacing the support device relative to the base element.

In a further consideration, the object stated above is achieved by a computer program comprising commands causing a control unit of a machine tool executing the program to perform at least the following steps: Retrieving a machine tool cocoon preferably according to one of the preferred embodiments of a machine tool cocoon according to the first consideration of the invention, by means of a tool spindle, as described above; displacing the tool spindle in the Z-direction to a workpiece clamping system in the machine tool; displacing the tool spindle in a predefined manner for opening the machine tool cocoon; and displacing the tool spindle in the Z-direction away from a workpiece clamping system in the machine tool.

The computer program can be part of a more extensive program for a machine tool. Said program is preferably present in NC code, for example G code or clear text. Said program can be provided as a download or on a physical storage medium. Such a computer program can also be manually input by the user of a machine tool at a terminal provided for this purpose and saved only on the control unit of the machine tool.

It is preferably provided that the predefined motion of the tool spindle comprises rotating the tool spindle about the Z-axis, preferably by about 90°. Alternatively or in addition, the predefined displacing of the tool spindle comprises displacing the tool spindle perpendicular to the Z-axis. Said displacing perpendicular to the Z-axis, that is, in the direction of the X-axis and/or Y-axis, is preferably performed until the support device is released from the base element. This can depend on the design of the locking device and/or closure lock. The length of the displacing preferably corresponds approximately to the length of the base element and/or of the support device in the direction of said displacing.

Steps are preferably provided subsequently thereto, such as preferably displacing the tool spindle in the X-direction and/or Y-direction at a high speed, preferably FMAX, displacing the tool spindle in the Z-direction at a reduced speed; rotating the tool spindle about the Z-axis for positioning the machine tool cocoon. Dwell times can be provided between individual steps.

Advantageous embodiments of the machine tool changing device and the method for operating a machine tool can be found in the dependent claims.

BRIEF DESCRIPTION OF THE FIGURES IN THE DRAWING

The invention is explained in greater detail below on the basis of at least one embodiment example using the figures of the drawing. Shown are:

FIG. 1 an embodiment example of a machine tool cocoon;

FIGS. 2a, 2b, 2c, and 2d the machine tool cocoon in the unlocked state;

FIGS. 3a, 3b, and 3c the machine tool cocoon in the locked state;

FIG. 4a, 4b, 4c machine tool cocoon having an example of a clamping tool in the unlocked state;

FIG. 5a, 5b, 5c machine tool cocoon having an example of a clamping tool in the locked state;

FIG. 6 second embodiment example of a machine tool cocoon in a closed state;

FIG. 7 the machine tool cocoon from FIG. 6 in an opened state;

FIG. 8 a section through a closure lock of the machine tool cocoon of the second embodiment example;

FIG. 9 the machine tool having a tool changing system; and

FIG. 10 a method for operating a machine tool.

DESCRIPTION OF A PREFERRED EMBODIMENT OF THE INVENTION

The subject-matter of the invention is described below in greater detail using the subject-matter shown in the figures. The following description of preferred embodiments serves to explain the invention in conjunction with the drawings.

FIG. 1 shows a schematic, transparent view of a machine tool cocoon 10 having a shell element 12, a cover element 14, and a base element 18. The cover element 14 comprises a recess 16. The shell element 12 and the cover element 14 together form a support device 11, even if said device need not necessarily comprise both the shell element 12 and the cover element 14. Depending on the embodiment, the support device 11 can also be formed differently, for example as a T, I, or L-shaped support, as a flap extending from the base element 18, or the like. The support device 11 serves for producing a connection between the base element 18 and a tool spindle and/or tool changer of a machine tool.

In the simplest embodiment of the invention, the machine tool cocoon 10 comprises only the base element 18 for positioning the workpiece 40. Workpieces 40 can thus be positioned and stocked by means of the machine tool cocoon 10 at tool positions 66 of a tool changing device or tool changing system 62 having a tool store as shown in FIG. 6.

The cover element 14 can be connected to the shell element 12 and is connected to the cover element 12 in the assembled state of the machine tool cocoon 10. The connection can be releasable in design, for example as a threaded connection. The connection can also be non-releasable in design, such as a welded, adhesive, or riveted connection.

The recess 16 serves for receiving and fixing a clamping device, not shown, as is typically used in known tool changing systems. Clamping devices 58 are shown in FIGS. 4a, 4b, and 4c. The machine tool cocoon 10 can eb brought out of a tool position 66 in a tool changing system 62 or a tool changing device 62 to a position in a machining unit 64 of the machine tool 60 by means of the clamping device. This is described in conjunction with FIG. 6.

Alternatively, a part of the clamping device or the clamping device can be releasably or non-releasably connected to the cover element 14.

The shell element 12, the cover element 14, and the base element 18 can be made of different materials. For example, of aluminum, of steel, of plastic, and/or of wood. It can also be provided that carbon fiber material is used for the shell element 12, the cover element 14, and/or the base element 18. The selection of the material is thereby adapted to the particular application and the particular machine tool. Sufficient strength of the machine tool cocoon 10 is thereby important.

The cover element 14 is preferably disposed inside the shell element 12, particularly inside an upper segment of the shell element 12. The shell element 12 in the embodiment example shown in FIGS. 1 through 5c comprises a shell body 22 having a rotationally symmetrical design with respect to an axis of rotation 20 and a wall thickness 24. The shell body 22 can be made of solid material or of a non-solid material, such as perforated sheet metal. The strength of the shell body 22 is thereby designed so that the cover element 14 and the base element 18 can be held at a defined spacing. The shell body 22 is further designed so that an object 23 disposed inside the machine tool cocoon 10 is protected. The dimension of the shell body 22 limits the size of the object 23, particularly of the workpiece 40. The shell element 12 has an outer diameter 26 and an inner diameter 28.

The shell body 22 is preferably cylindrical in design. Said body can also, however, be designed as any arbitrary body of revolution, for example conical in shape, as a hyperboloid of revolution, or having a polygonal outer surface. One embodiment example having a non-rotationally-symmetrical shell body 22 is shown in FIGS. 6 through 8 and is described in more detail below.

The cover element 14 can be implemented integrally with the cover element 12. The cover element 14 can then be releasably connected directly to the base element 18.

A first locking element 32 of a locking device 34 is disposed on an inner wall 30 of the shell element 12. The locking element 32 is preferably disposed in a lower segment 35 of the shell body 22 in which the base element 18 is positioned in the assembled state. The base element 18 is positioned in the bottom segment 35 during operation and releasably connected to the shell element 12 and releasably fixed by means of a second locking element 36 of the locking device 34. The second locking element 36 is thereby disposed on an outer wall 38 of the base element 18.

A workpiece 40 to be machined is disposed on the base element 18. Fixation elements, not shown, are provided for fastening or fixing the workpiece 40. The base element 18 is positioned in a zero-point clamping system 76 of the machine tool for machining in the machining unit of the machine tool.

The locking device 34 is preferably implemented as a bayonet joint 34a. The bayonet joint 34a is a mechanical connection for connecting and releasing quickly between the base element 18 and the shell element 12. The base element 18 and the shell element 12 are preferably cylindrical in design. The base element 18 and the shell element 12 can be connected to each other by inserting and rotating relative to each other, and thus also separated again. The first locking element 32 and the second locking element 36 thereby engage with each other. The first locking element 32 and the second locking element 36 are operatively connected.

The locking device 34 can also be implemented as a pressure piece or as a gripper system. Any type of locking able to be opened and locked repeatedly is fundamentally suitable as a locking device. The first locking element 32 is implemented as a protrusion 42 in the embodiment example shown here, wherein two protrusions 42a and 42b disposed substantially opposite each other are shown in FIG. 1. The second locking element 36 is correspondingly shown as a recess 44, wherein two recesses 44a and 44b are shown, also substantially opposite each other. In alternative embodiments, the locking device 34 can also comprise more than two locking elements, for example three or four. The recesses 44a, 44b are implemented here as radial recesses extending about a part of the circumference. Said radial recesses 44a, 44b are bounded in the axial direction on one side by an offset 80 extending radially and on the other side by two collars 82a, 82b extending radially, so that a region for engaging behind is formed. Segments 84a, 84b are provided between the collars 82a, 82b and offset 90° with respect to FIG. 1, so that the protrusions 42a, 42b extending radially inward on the shell element 12 can be slid between the collars 82a, 82b in order to then be able to be slid in the circumferential direction in behind the collars 82a, 82b and into the recesses 44a, 44b.

The machine tool cocoon 10 having a locking device 34 implemented as a bayonet joint 34a is shown in the unlocked state in FIGS. 2a, 2b, 2c, and 2d. FIGS. 3a, 3b, and 3c show the machine tool cocoon 10 having the bayonet locking device 34a in the locked state.

Identical items are labeled with identical reference numerals and in this respect, reference is made to the description for FIG. 1.

FIG. 2a shows the machine tool cocoon 10 from FIG. 1 having a cover element 14 and base element 18 installed in the shell element 12, wherein the base element 18 and the shell element 12 are unlocked. The base element 18 is shown in FIG. 2b as a section per IIb from FIG. 2c. The first locking element 32 disposed on the inner wall 30 of the shell element 12 comprises two protrusions 42a and 42b disposed opposite each other.

When assembling, the shell element 12 is placed over the base element 18 or the base element 18 is inserted into the shell element 12, wherein the second locking element 36 is implemented as a recess 44a and 44b. The protrusions 42a and 42b engage in the recesses 44a and 44b of the base element 18 and then form an axially fixed connection when rotated. More than two protrusions 42 and more than two recesses 44 can also be provided in order to implement the bayonet joint 34a.

The connection thus takes place by means of an insert-rotate motion. The two parts to eb connected, the base element 18 and support device 11 or shell element 12, are place into each other. The protrusions 42a and 42b are thereby implemented nearly perpendicular to the axis of rotation 20, that is, to the insertion motion, and do not run all around but rather are interrupted, whereby placing one inside each other is made possible. The protrusions 42a and 42b can be implemented slightly beveled in the plane perpendicular to the axis of rotation 20 and thus to the direction of insertion, whereby the base element 18 and the shell element 12 are pressed against each other by a rotary motion.

The longitudinal section IIc according to FIG. 2b is shown in FIG. 2c. The section rungs through the two collars 82a, 82b, but not through the two protrusions 42a, 42b, as said features are not disposed within the recesses 44a, 44b in FIG. 2a, but rather in the region of the segments 84a, 84b. As shown in FIG. 2c in the longitudinal section IIc according to FIG. 2b, a closure lock 78, here in the form of an anti-rotation device 45, is further provided and is implemented as a latching device 45 in FIGS. 2, 3, and 4. The latching device 45 comprises a compression spring 46, a clamping bolt 48, and closure plate 50. The closure plate 50 has a through hole 51 through which extends a first segment 48a having the small diameter of the clamping bolt 48 (cf. also FIGS. 4a, 4b). The closure plate 50 is fixed relative to the base element 18, for example by means of a screw 86. The clamping bolt 48 has a closure protrusion 48b having a larger diameter than the through hole 51, so that the clamping bolt 48 is retained between closure plate 50 and the base element 18. The compression spring 46 serves for loading the clamping bolt 48 downward with reference to FIG. 2c. In FIG. 2c, however, the clamping bolt 48 is shown in a setting displaced upward. Shifted downward, the first segment 48a having a lesser diameter extends through the through hole 51 and axially downward in front of the closure plate 50. In the position shifted downward, the closure protrusion 48b then extends into the recess 44b. The first protrusion 42a comprises a first latch recess 43a, and the second protrusion 42b comprises a second latch recess 43b (cf. FIGS. 1 and 2b). When the clamping bolt 48 is in the position shifted downward, the closure protrusion 48b engages in the latch recess 43b and thus secures the support device 11 against rotating relative to the base element 18.

If the base element 18 is then placed on a flat surface, such as in the machining unit, the clamping bolt 48 is pressed upward and the closure protrusion 48b is guided axially upward out of the latch recess 43b. The locking device 34 is released and the support device 11 can be rotated relative to the base element 18, so that the first and second protrusions 42a, 42b enter the segments 84a, 84b and thus make it possible for the support device 11 to be axially removed from the base element 18.

In the inverse case, when the support device 11 is disposed on the base element 18 and the locking device 34 is in a closed position (as shown in FIGS. 3a through 3c), and the machine tool cocoon 10 is then raised, the compression spring 46 presses the clamping bolt 48 downward and the closure protrusion 48b engages in the latch recess 43b.

A spring-loaded ball bearing can also be used as the closure lock 78 or anti-rotation device 45. Any other anti-rotation device 45 suitable for ensuring the connection between the base element 18 and shell element 12 and/or cover element 14 during a rotary motion of the working spindle 72 of the machine tool is suitable.

Alternatively to the method of rails engaging in each other (protrusion 42a, 42b and recess 44a, 44b), a correspondingly differently shaped indentation on one part and a projection on the other part (shell element 12, cover element 14, and base element 18) can be used.

Figure 1:
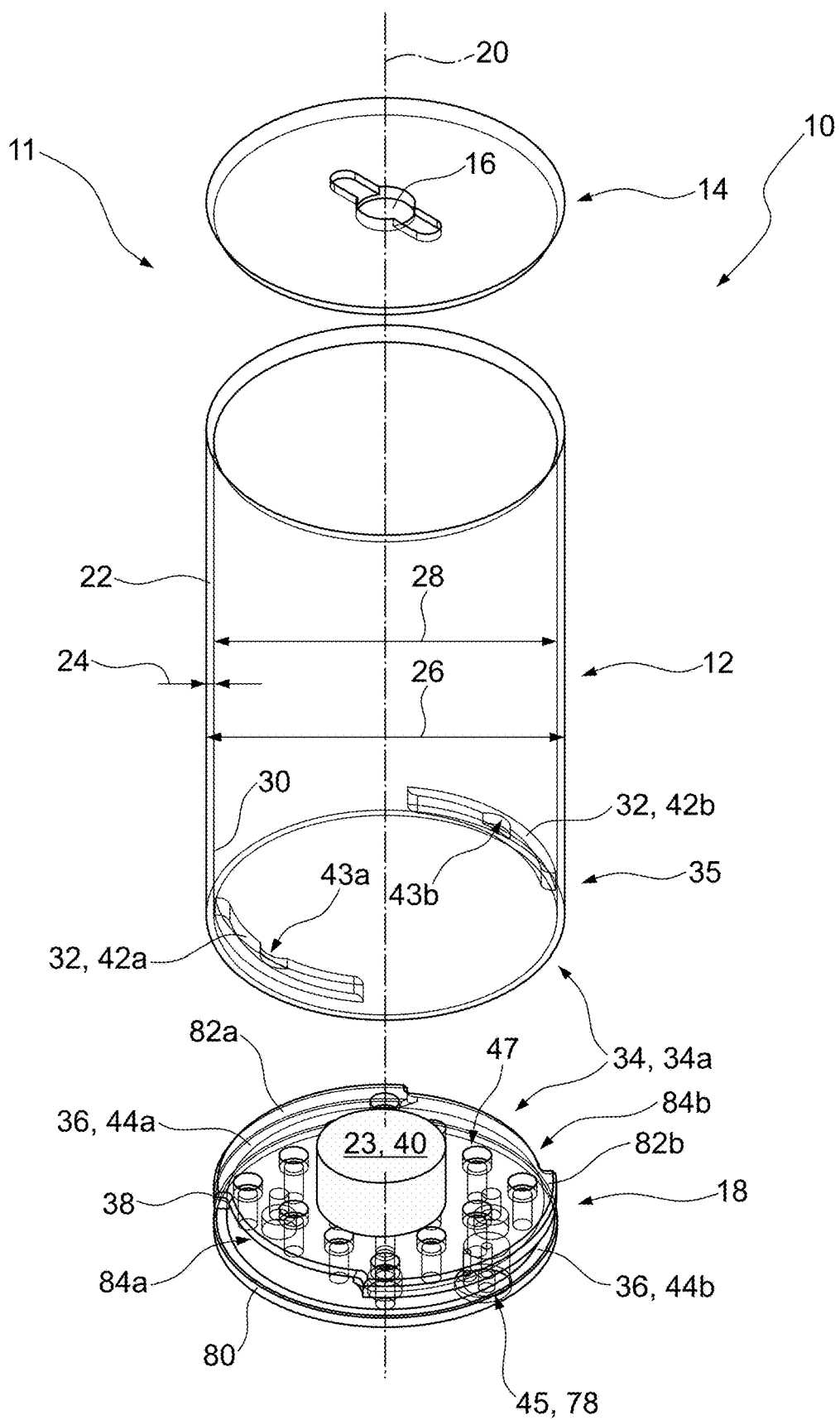
Figure 2A:
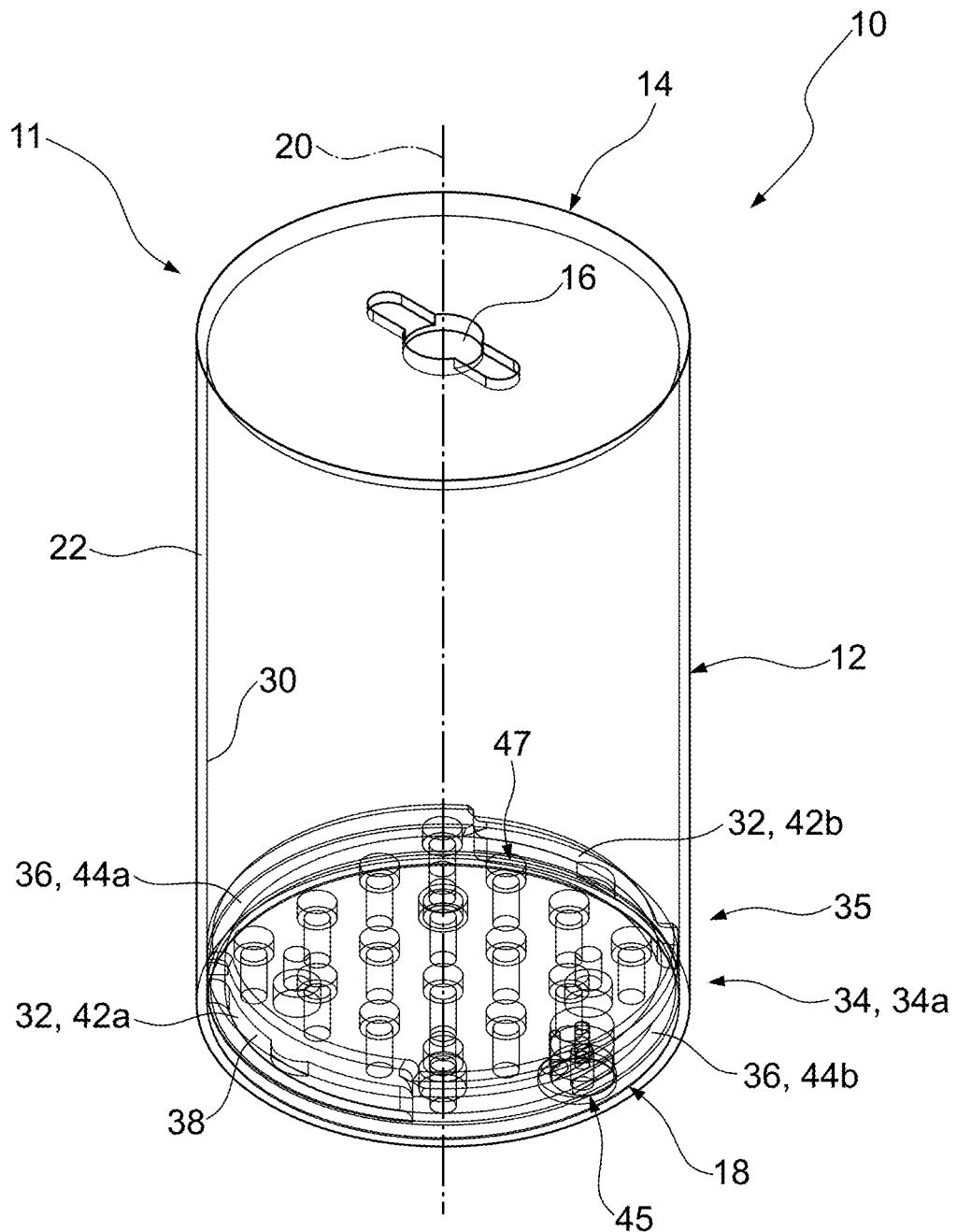
FIG. 2d shows the shell element 12 and the base element 18 in the section view as a longitudinal section according to IId from FIG. 2b.
FIG. 2b shows further receptacles 47 for receiving and fixing the workpiece 40, implemented here as holes.
Figure 2B:
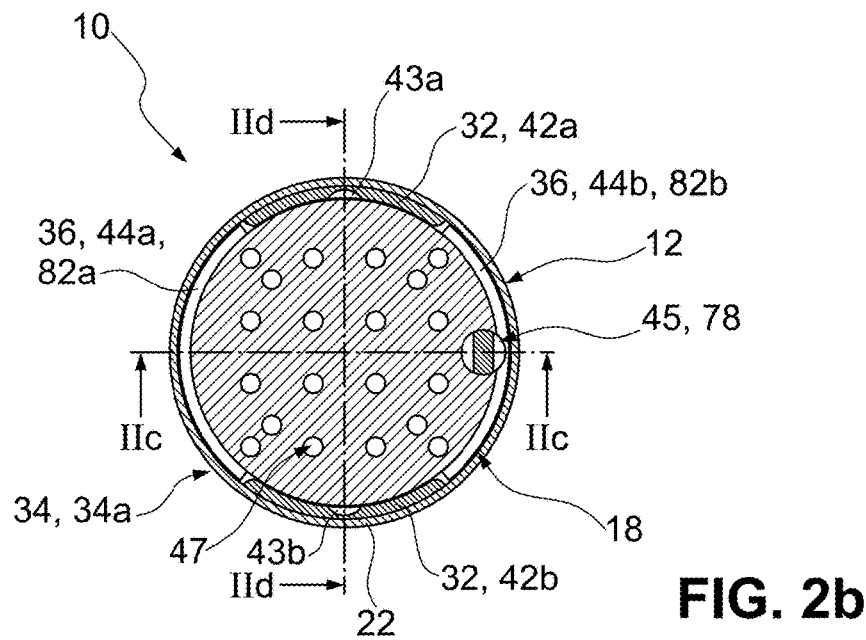
Figure 2C:
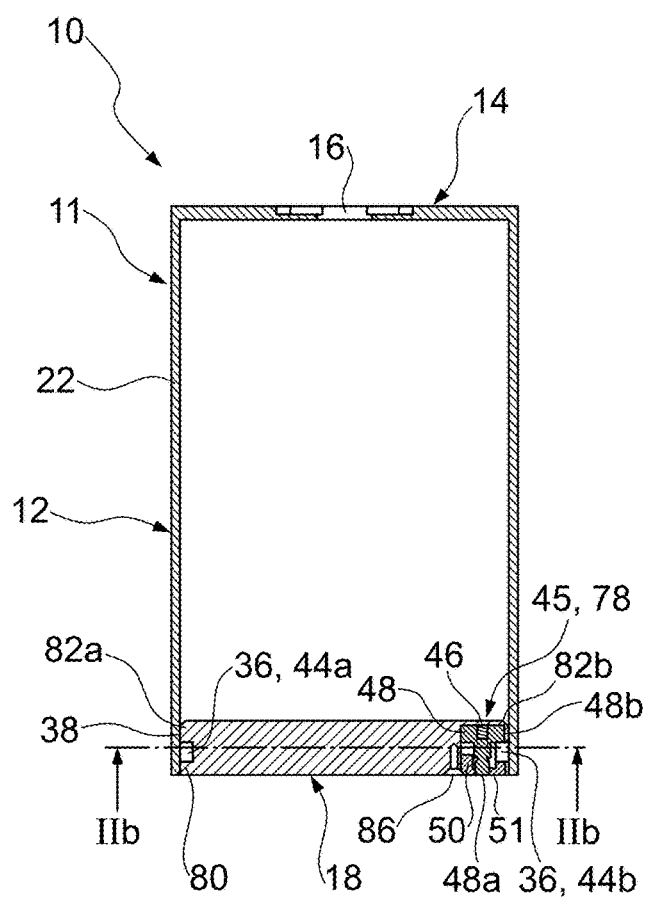
Figure 2D:
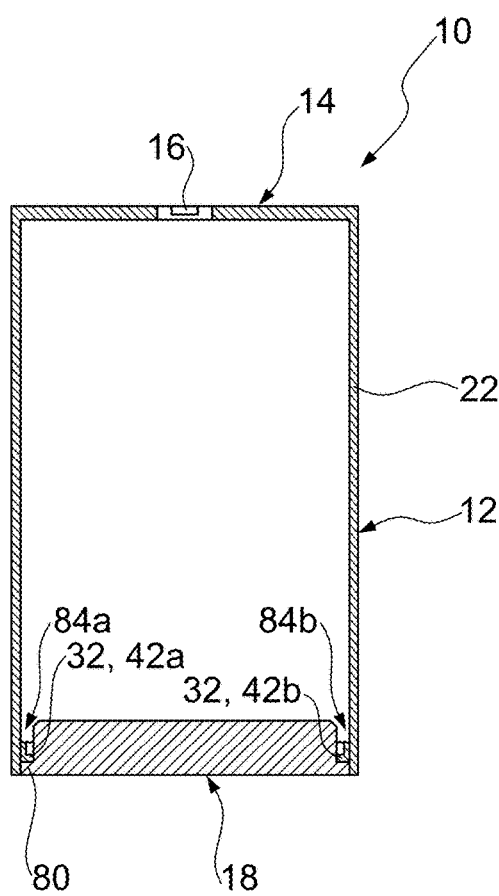
Figure 3A:
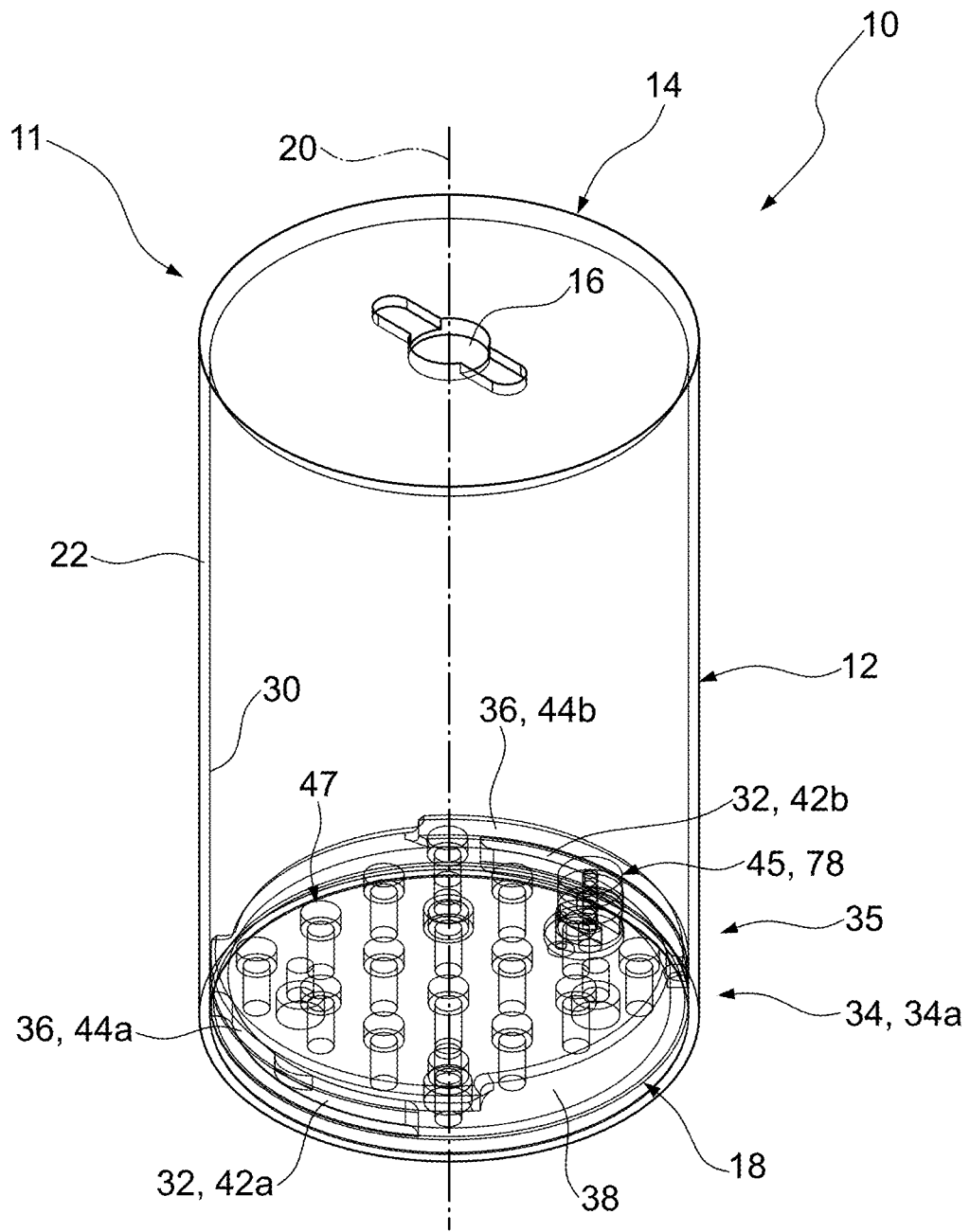
Figure 3B:
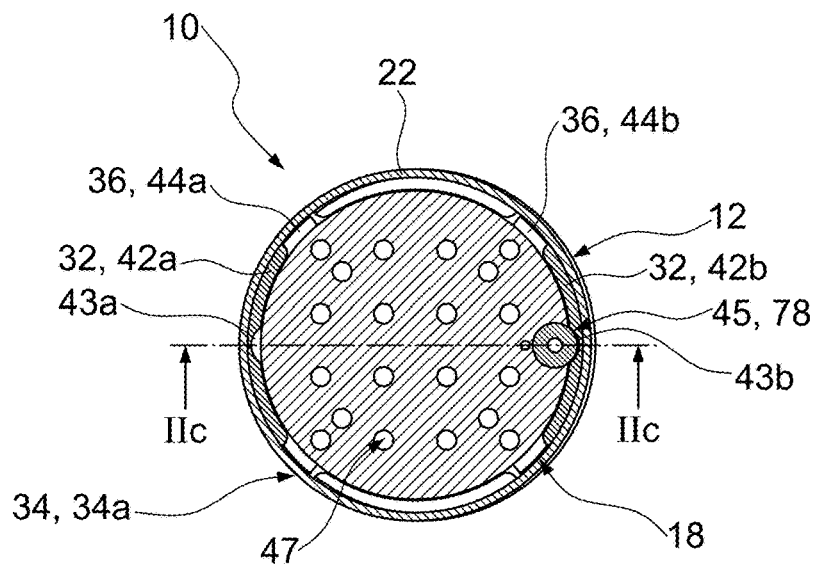
Figure 3C:
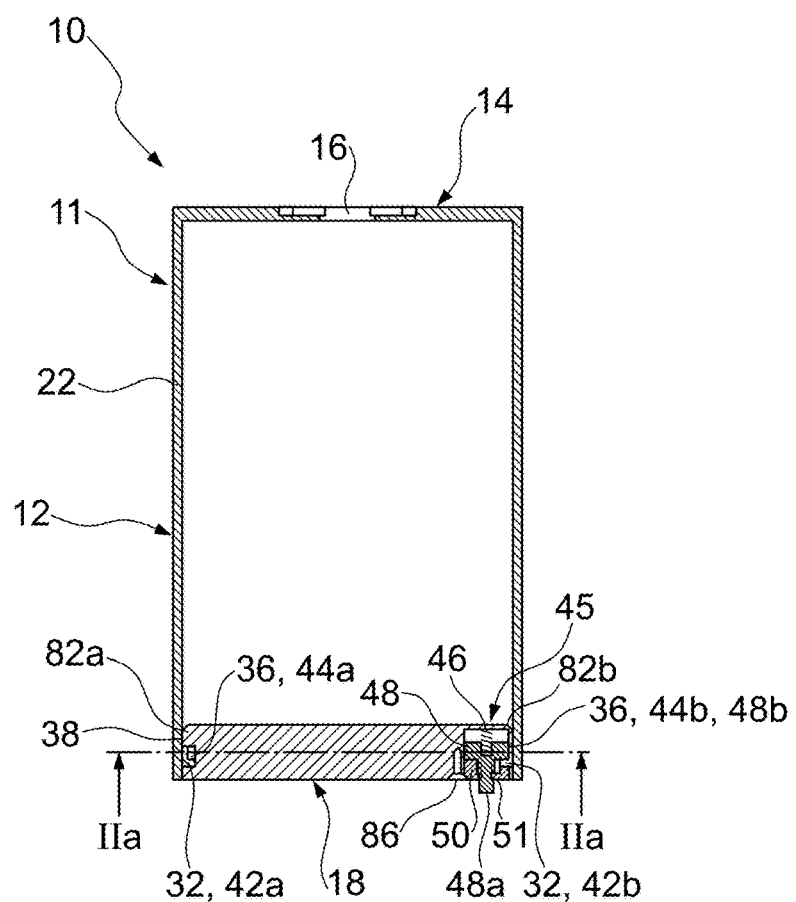

FIGS. 3a, 3b, and 3c each show the machine tool cocoon 10 having in the locked state. FIG. 3a is thereby a transparent, schematic, perspective view, FIG. 3b is a plan view having a section in the plane IIa-IIa of FIG. 3c, and FIG. 3c is a longitudinal section 11c-11c of the depiction from FIG. 3a.

FIG. 4a shows the machine tool cocoon 10 in an exploded perspective view. FIG. 4b shows an exploded side view of the machine tool cocoon 10 and FIG. 4c shows the machine tool cocoon 10 from FIG. 4b in a side view offset by 90°. The machine tool cocoon 10 is connected to a clamping device 52 in FIGS. 4a, 4b, and 4c. The connection interface 54 between the clamping device 52 and the machine tool cocoon 10 is the recess 16 on the support device 11 or on the cover element 14 of the machine tool cocoon 10, into which a connecting element 56 (not shown) of the clamping device 52 has engaged. By rotating the connecting element 56 in the recess 16, the clamping device 52 is releasably connected to the machine tool cocoon 10 and fixed to the same.

One example for the clamping device 52 is the interface SK40. The interface between the working spindle or tool spindle 72 and the clamping device 52 is shown schematically as 58.

FIGS. 5a, 5b, and 5c show the machine tool cocoon 10 in perspective and side views corresponding to the depictions in FIGS. 4a, 4b, and 4c and having the clamping device 58 in the locked state. Identical items are labeled with identical reference numerals.

In the locked state, the base element 18 and the support device 11 or shell element 12 are rotated 90° relative to each other, so that the protrusions 42a and 42b have engaged in the recesses 44a and 44b, such that when displaced parallel to the axis of rotation 20, the position of the base element 18 and the support element 12 remain unchanged.

The locking can be released again when the shell element 12 and the base element 18 are rotated relative to each other and opposite each other in a plane perpendicular to the axis of rotation 20, preferably by 90°. The recess 44a, 44b and protrusion 42a, 42b are released from the locked state.

Figure 6:
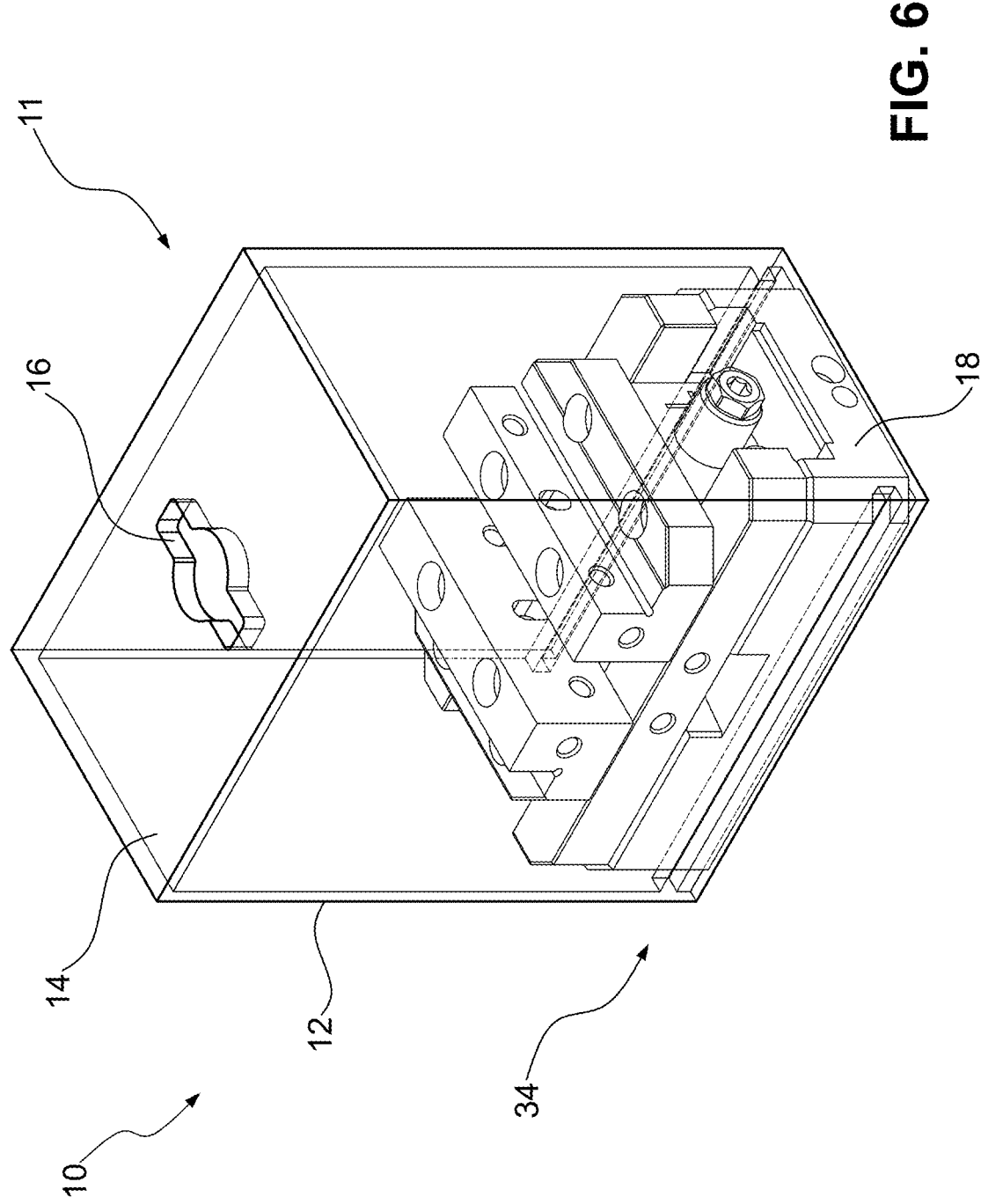
Figure 7:
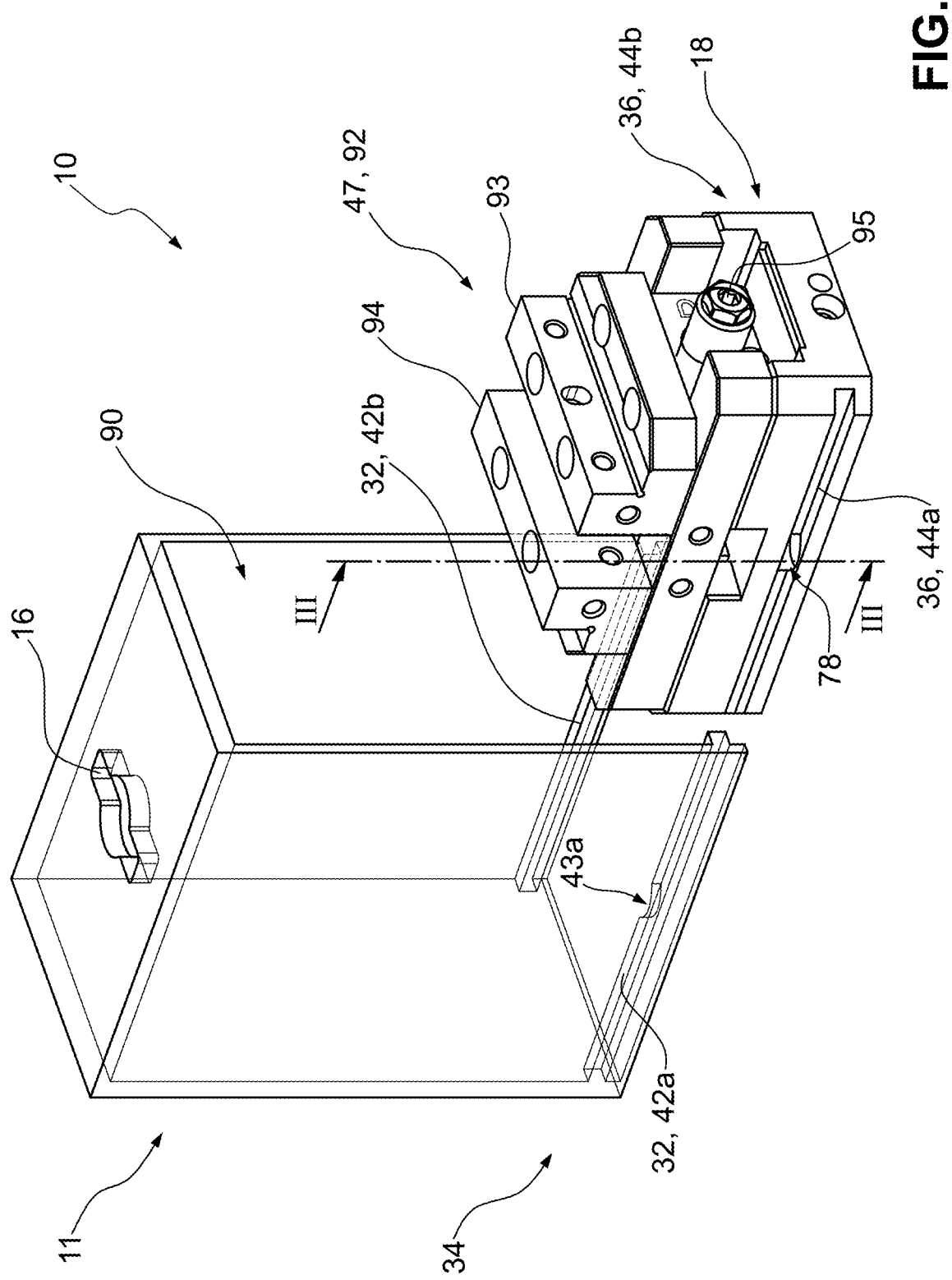
Figure 8:
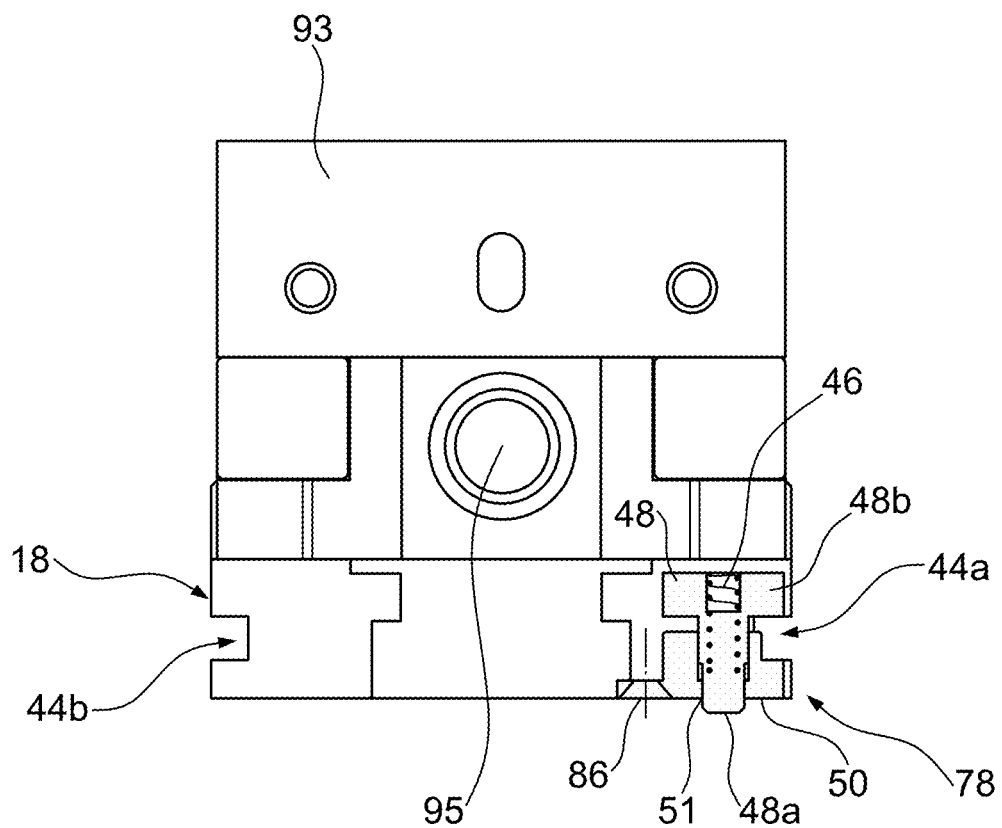

FIGS. 6, 7, and 8 illustrate a second embodiment example. Identical and similar elements are labeled with the same reference numerals as in the first embodiment example, so that reference is made in full to the above description and only the differences are emphasized.

A first difference to the first embodiment example is that the support device 11 or the shell element 12 and the cover element 14 is or are not cylindrical, but rather rectangular. The base element 18 is also not disc-shaped, but rather rectangular and has beveled edges.

In order to attach the support device 11 to the base element 18, said device is not placed from above as in the first embodiment example, but rather the support device 11 is slid laterally onto the base element 18. To this end, the support device 11 comprises a side opening 90 in the shell element 12. Such lateral sliding in, however, is not exclusive to the second embodiment example, but rather could also be implemented in the first embodiment example.

In a similar manner as in the first embodiment example (FIGS. 1 through 5c), the machine tool cocoon 10 comprises a locking device 34 comprising a first locking element 32 and a second locking element 36. The first locking element 32 here comprises a first protrusion 42a and a second protrusion 42b, implemented here as first and second strips. The first and second protrusions 42a, 42 extend inward on the shell element 12 and are aligned in the insertion direction. The base element 18 comprises first and second lateral recesses 44a, 44b as the second locking element 36, implemented here as lateral grooves or slits and corresponding to the strips. As can be seen in FIG. 7, the first protrusion 42a comprises a latch recess 43a, as has been fundamentally described above with reference to the first embodiment example. A closure lock 78 is provided in turn on the base element 18 and will be explained in more detail with reference to FIG. 8.

A receptacle 47 in the form of a machine vise 92 is provided on the base element 18 in the second embodiment example shown here. Said vise comprises a first clamping jaw 93 and a second clamping jaw 94 able to be clamped against each other by means of a screw spindle 95, in order to thus clamp a workpiece 40 (not shown in FIG. 7) between the same.

FIG. 8 illustrates a full section through the base element 18 including the receptacle 47 in the form of the machine vise 92 per second III-III from FIG. 7. The closure lock 78 can be seen in FIG. 8 and can also be referred to here as a shift lock device, following the first embodiment example. Said device comprises the same components as the closure lock 78 of the first embodiment example, namely a clamping bolt 48, a closure plate 50, and a compression spring 46. The first segment 48a having a smaller diameter of the clamping bolt 48 is shown in FIG. 8 in an intermediate position, neither all the way down in a closed position nor all the way up in a release position. When the clamping bolt 48 is displaced downward in the direction of the closed position, the closure protrusion 48b of the clamping bolt 48 enters the first recess 44a and can engage there in the latch recess 43a when the support device 11 is positioned accordingly. When the clamping bolt 48 is displaced upward against the force of the compression spring 46, for example, because the machine tool cocoon 10 is positioned on a flat surface, the closure protrusion 48b of the clamping bolt 48 is also displaced upward and releases the first recess 44a, so that the support device 11 can be placed onto the base element 18 or removed from the same unimpeded.

Embodiments can also be provided wherein the closure lock 78 can be magnetically or electromagnetically locked and released.

Figure 9:
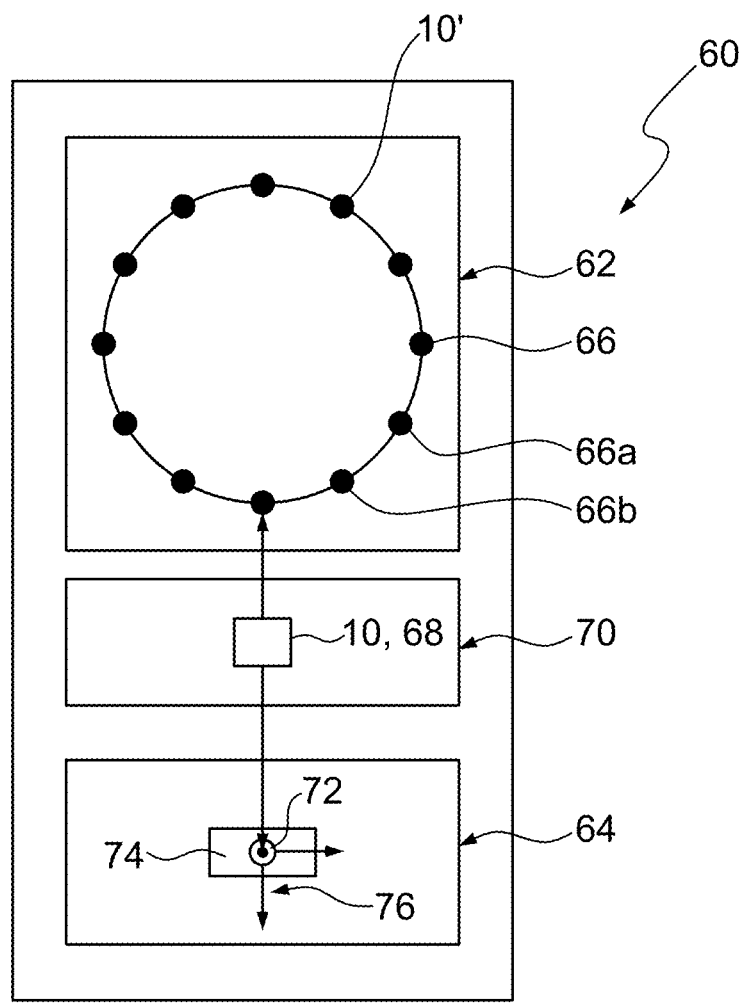

FIG. 9 shows the complete arrangement of a machine tool 60 having a tool changing device 62, also referred to as a tool changing system 62, and a machining unit 64 for workpieces 40. Tool positions 66 are provided in the tool changing system 62. Both tools 68 and the machine tool cocoon 10, having or not having workpieces 40 disposed therein, can be positioned at the corresponding tool positions 66. The dimensions of the machine tool cocoon 10 are thereby selected so as to correspond to the dimensions for the tool 68. Typical dimensions are: the maximum diameter for the shell element 12 is about 100 to 150 mm, and the maximum height for the shell element 12 is about 150 mm. Other dimensions for the machine tool cocoon 10 are also possible, wherein the dimensions of the machine tool cocoon 10 correspond to the dimensions of the tool used.

A transfer system 70 is disposed between the tool changing system 62 and the machining unit 64 and transfers the corresponding tool 68 from the tool position 66 into the machining unit 64. The transfer system 70 can also be implemented in that the tool spindle 72 of the machining unit 64 is transportable and travels directly to the tool positions 66 and grasps the tool 68 and/or the machine tool cocoon 19 there. The transfer system 70 thereby grasps the clamping device 52 on which the tool 68 is disposed and positions the same in a tool receptacle 72, preferably in a tool spindle 72 of the machining unit 64. The transfer system 70 correspondingly grasps the clamping device 52 disposed in the recess 16 of the machine tool cocoon 10. wherein the machine tool cocoon 10 is disposed at a position 66*b*, for example, transfers the same into the machining unit 64, and positions the machine tool cocoon 10 having the workpiece 40 to be machined at the machining position 74. A further machine tool cocoon 10' is positioned at a further position. The machining position 74 thereby comprises a known zero-point clamping system 76, as is used as a standard in machine tools 60. The machining position 74 is thereby disposed approximately below the tool position in the zero-point clamping system 76. Alternatively, the machine tool cocoon 10 can be transported by means of the spindle 72 and thus brought into the machining position 74.

The machine tool cocoon 10 is opened in that the base element 18 and the shell element 12 are displaced relative to each other, the locking device 34 is opened, and the shell element 12 is removed from the machining position 74. The clamping device 52 thereby remains disposed on the cover element 14.

Said machine tools use tools 68 such as mills, drills, or indexable tip cutters. The tool 68 is thereby mounted in a main spindle 72. The machine tool cocoon 10 can thereby be used in both metal-processing machine tools and in wood-processing machines.

Figure 10:
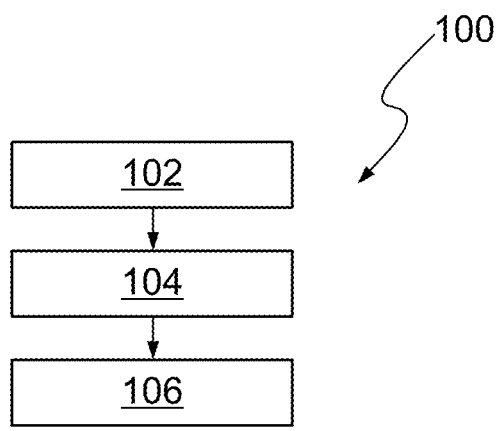

FIG. 10 describes a method 100 for operating a machine tool 60 wherein a machine tool 10 is used.

In the method step 102, the tool positions 66 of the tool changing unit 62 are populated both with tools 68 and with machine tool cocoons 10. The workpieces 40 to be machined are each disposed in the machine tool cocoons 10.

In method step 104, a machining program comprising the process steps to be performed in sequence is loaded. The machining program comprise both program steps for selecting the tool 68 suitable and used for a machining step, and program steps for changing out the workpiece 40 to be machined. The machining program thus comprises selecting and positioning a workpiece 40*a*, as well as selecting and positioning the tools 68*a*, 68*b*, etc. suitable for machining the workpiece 40*a*. The machining program further comprises steps for removing the workpiece 40*a* from the machining position 74 and for transferring into a previously programmed tool position 66 and for selecting and positioning a further workpiece 40*b* out of the tool position 66*b* into the machining position in the machining unit 64.

The machining program is started in the method step 106. The workpieces 40 positioned in the tool store of the tool changing system 62 are automatically machined in the machining process, wherein said workpieces are brought out of the tool changing unit 62 into the machining unit 64. Both the tool 68 and the machine tool cocoon 10 are thereby transferred to a machine tool spindle or work spindle 72 or connected to the same. If a transfer unit 70 is used, the same interface unit is used for transporting the machine tool cocoon 10 as for the tool 68.

After the corresponding machining step, the workpieces 40, 40*a*, 40*b*, etc. are again brought into the corresponding tool position 66, 66*a*, 66*b*, etc. by means of the machine tool cocoon 10. The workpiece 40, 40*a*, 40*b*, etc. is thereby provided in each case by a relative rotary motion between the base element 18 and by the shell element 12 of the machine tool cocoon 10 and displacing the shell element 12 out of the machining area of the machining unit 64 for machining by the correspondingly chucked tool 68.

The invention claimed is:

1. A method for automatically operating a machine tool, the machine tool having a tool changing system and a machining unit having a tool spindle, wherein one or more tools for placing in the tool spindle and one or more workpieces to be machined are disposed in a tool store of the tool changing system, wherein each workpiece of the one or more workpieces is disposed in a respective machine tool cocoon of a plurality of machine tool cocoons, each machine tool cocoon comprising:

a base element on which a corresponding workpiece of the one or more workpieces can be disposed, wherein the base element comprises at least one receptacle for receiving and fixing the corresponding workpiece; and, a support device separably connected to the base element, wherein the machine tool cocoon can be positioned on a tool position of the tool changing system by means of the support device;

wherein the support device is reversibly separable from the base element by a predefined relative motion between the support device and the base element, wherein the support device comprises a cover element connected to the base element, wherein the support device comprises a shell element disposed between the cover element and the base element, and wherein the shell element encloses the corresponding workpiece; the method comprising:

with the tool spindle, grasping a first machine tool cocoon of the plurality of machine tool cocoons having a first workpiece disposed therein;

transporting the first machine tool cocoon to a workpiece clamping system of the machining unit;

clamping the base element of the first machine tool cocoon in the workpiece clamping system;

performing the predefined relative motion between the support device of the first machine tool cocoon and the base element of the first machine tool cocoon by displacing the support device of the first machine tool cocoon relative to the base element of the first machine tool cocoon for opening the first machine tool cocoon; and machining the first workpiece, wherein the displacing of the support device of the first machine tool relative to the base element of the first machine tool for opening the first machine tool cocoon is performed by a motion of the tool spindle in which the tool spindle is rotated in a range from greater than 0° to less than 360°.

2. The method according to claim 1, comprising after the displacing of the support device relative to the base element:

lifting the support device off of the base element by the tool spindle;

bringing the support device to a location away from the first workpiece;

releasing the support device from the tool spindle; and clamping a first tool of the one or more tools from the tool changing system at the tool spindle.

3. The method according to claim 2, comprising:

bringing the first machine tool cocoon including the machined first workpiece into the tool changing system.

4. The method according to claim 1, comprising after machining the first workpiece:

bringing the support device to the base element; and connecting the support device and the base element.

5. The method according to claim 4, comprising:
releasing the workpiece clamping system for releasing the base element;
displacing the first machine tool cocoon by a predefined motion;
clamping the base element of a second machine tool cocoon of the plurality of machine tool cocoons in the workpiece clamping system;
displacing the support device of the second machine tool cocoon relative to the base element of the second machine tool cocoon for opening the second machine tool cocoon; and
machining a second workpiece of the one or more workpieces.

6. The method according to claim 5, wherein the predefined motion is a rotation in a range from greater than about 0° to about 90°.

7. The method according to claim 4, comprising:
with the tool spindle, grasping a further machine tool cocoon of the plurality of machine tool cocoons having a further workpiece of the one or more workpieces disposed therein;
transporting the further machine tool cocoon to the workpiece clamping system of the machining unit;
clamping the base element of the further machine tool cocoon in the workpiece clamping system;
displacing the support device of the further machine tool cocoon relative to the base element of the further machine tool cocoon for opening the further machine tool cocoon; and
machining the further workpiece.

\* \* \* \* \*